(12) United States Patent
Chen

(10) Patent No.: US 7,023,329 B2
(45) Date of Patent: Apr. 4, 2006

(54) AIR PRESSURE INDUCTION TYPE VEHICLE ANTI-THIEF DEVICE

(75) Inventor: Shin-Chung Chen, Luchu (TW)

(73) Assignee: Tung Thih Enterprise Co., Ltd., Taoyuan (TW)

( * ) Notice: Subject to any disclaimer, the term of this patent is extended or adjusted under 35 U.S.C. 154(b) by 99 days.

(21) Appl. No.: 10/867,762

(22) Filed: Jun. 16, 2004

(65) Prior Publication Data

US 2005/0280516 A1    Dec. 22, 2005

(51) Int. Cl.
*B60R 25/10* (2006.01)

(52) U.S. Cl. .......................... 340/426.25; 340/426.13; 340/426.2; 340/426.24; 340/550; 340/566

(58) Field of Classification Search ............ 340/426.1, 340/426.13, 426.18, 426.19, 426.2, 426.24, 340/426.25, 429, 541, 550, 566
See application file for complete search history.

(56) References Cited

U.S. PATENT DOCUMENTS

| | | | | |
|---|---|---|---|---|
| 5,258,741 A | * | 11/1993 | Fuller | 340/426.31 |
| 5,530,419 A | * | 6/1996 | Ross et al. | 340/426.25 |
| 6,429,773 B1 | * | 8/2002 | Schuyler | 340/425.5 |
| 6,535,116 B1 | * | 3/2003 | Zhou | 340/447 |

* cited by examiner

*Primary Examiner*—Van T. Trieu
(74) *Attorney, Agent, or Firm*—Bacon & Thomas, PLLC

(57) ABSTRACT

An air pressure induction type vehicle anti-thief device includes an on-vehicle main unit installed in a motor vehicle adapted to detect variation of air pressure in the inside chamber of the motor vehicle through an air pressure sensor and to drive an alarm to output an alarm signal when the amount of variation of transient variation of air pressure surpassed a predetermined safety air pressure value.

10 Claims, 3 Drawing Sheets

AIR PRESSURE INDUCTION TYPE VEHICLE ANTI-THIEF DEVICE

BACKGROUND OF THE INVENTION

1. Field of the Invention

The present invention relates to a vehicle anti-thief device and more particularly, to an air pressure induction type vehicle anti-thief device.

2. Description of Related Art

In order to prevent stealing of the car by a thief or occurrence of an accident, the owner of the car may install a anti-thief device in the car. When leaving the car, the owner of the car can initiate the anti-thief device, driving different sensors to detect different abnormal conditions.

When an abnormal condition of the car occurred, for example, an intruder intruded the car, the corresponding sensor is induced to trigger the anti-thief device. Conventional anti-thief devices commonly use a siren to give a sharp sound to threaten the intruder. When heard the sharp sound of the siren, the owner of the car can rapidly come to the place of the car to examine what happened.

However, the sharp sound of the siren of a motor vehicle anti-thief device is hearable within a limited distance. The owner of the motor vehicle may not be able to hear the sharp sound of the siren of the motor vehicle during the occurrence of an abnormality of the motor vehicle. In this case, the owner of the motor vehicle cannot take the necessary step in time. Further, when the motor vehicle is being removed by a wrecker, the owner of the motor vehicle cannot know what is happening if he or she does pot hear the sound of the alarm of the anti-thief device of the motor vehicle. In this case, the owner of the motor vehicle knows that the motor vehicle has been taken away only when returns to the parking place. The aforesaid conditions happened just because the motor vehicle anti-thief device is unable to actively inform the owner of the motor vehicle. In general, a conventional motor vehicle anti-thief device cannot well protect the motor vehicle or actively inform the owner of the motor vehicle of the occurrence of an abnormality of the motor vehicle. Further, the sharp sound of the alarm causes a noise problem to the surroundings.

Therefore, it is desirable to provide a vehicle anti-thief device that eliminates the aforesaid drawbacks.

SUMMARY OF THE INVENTION

The present invention has been accomplished under the circumstances in view. It is therefore the main object of the present invention to provide an air pressure induction type vehicle anti-thief device, which determines the occurrence of an abnormality of the motor vehicle by means of actively detecting the variation of air pressure in the inside chamber of the motor vehicle. It is another object of the present invention to provide an air pressure induction type vehicle anti-thief device, which automatically informs the owner of the motor vehicle upon detection of an abnormality of the motor vehicle.

To achieve these and other objects of the present invention, the air pressure induction type vehicle anti-thief device is installed a motor vehicle, comprising an on-vehicle main unit, at least one sensor mounted in at least one corresponding location of the motor vehicle and electrically connected to the on-vehicle main unit, each sensor adapted to detect an abnormality of the respective corresponding location in of the motor vehicle and to send a corresponding abnormality signal to the on-vehicle main unit, and at least one alarm device electrically connected to the on-vehicle main unit and controlled to output a corresponding alarm signal upon the on-vehicle main unit in receipt of said corresponding abnormality signal from one the sensor by the on-vehicle main unit. The at least one sensor includes an air pressure sensor installed in the inside chamber of the motor vehicle at a predetermined location and adapted to detect the amount of variation of air pressure in the inside chamber. The air pressure sensor sends an air pressure abnormality signal to the on-vehicle main unit, causing the on-vehicle main unit to control the at least one alarm device to output the alarm signal when the detected amount of transient variation of air pressure surpassed a predetermined safety air pressure value.

DETAILED DESCRIPTION OF THE PREFERRED EMBODIMENT

Figure 1:
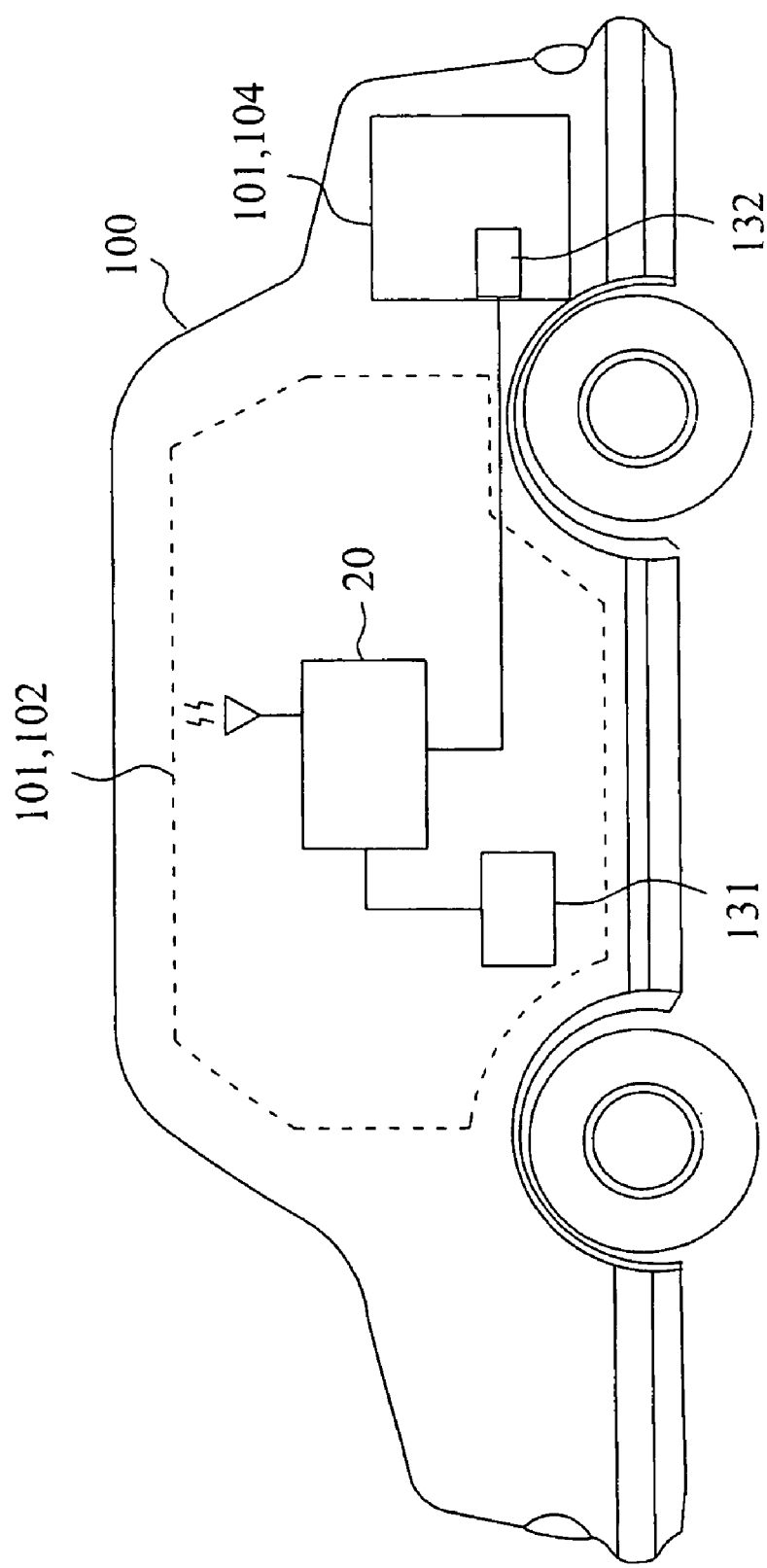
FIG. 1 is a schematic drawing showing an operation environment according to the present invention.
Figure 2:
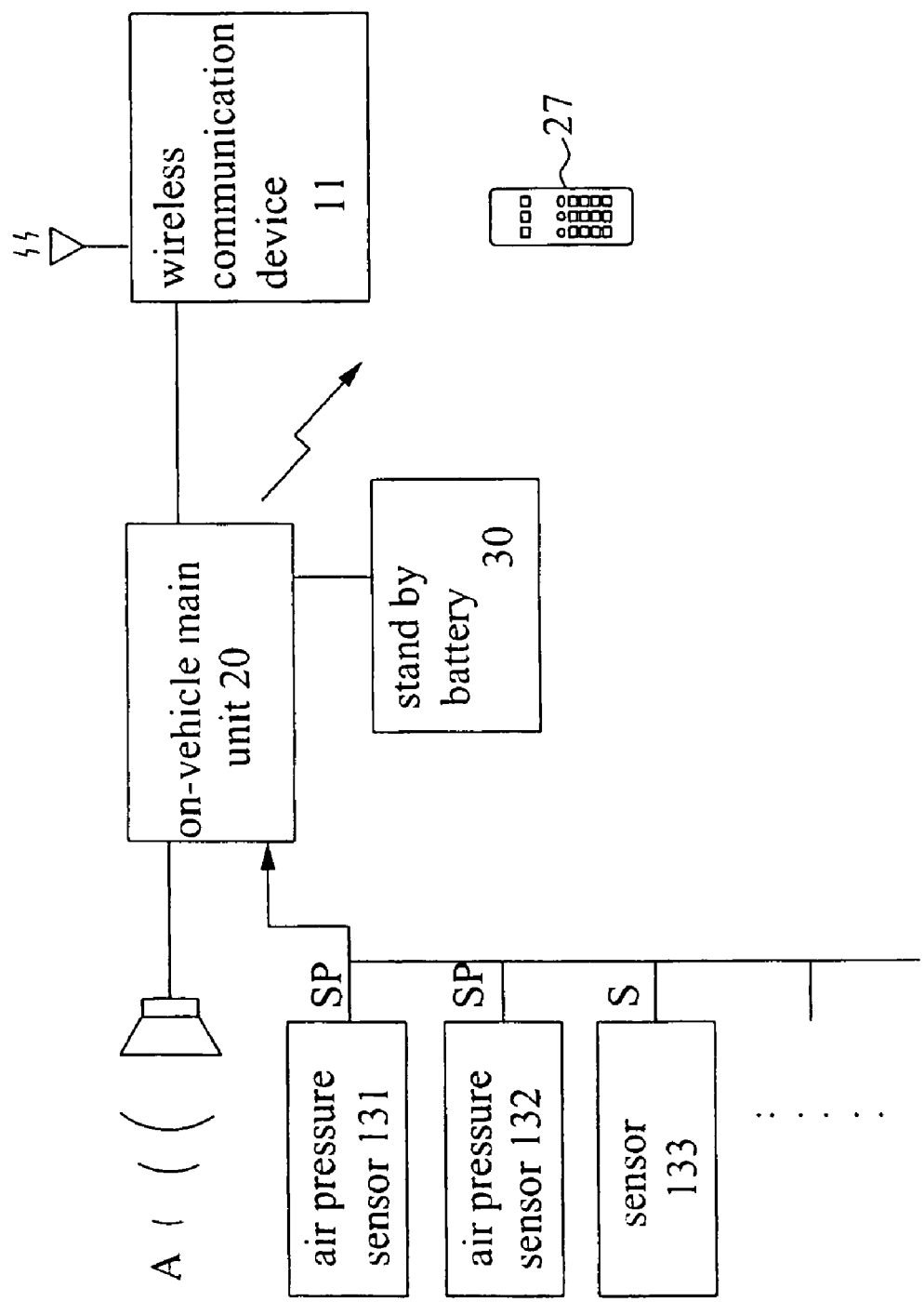
FIG. 2 is a system block diagram of the present invention.

Referring to FIG. 1 and 2, an air pressure induction type vehicle anti-thief device in accordance with the present invention is shown comprising an on-vehicle main unit 20 installed in the inside chamber 101 of a car 100. The on-vehicle main unit 20 is electrically connected to air pressure sensors 131, 132 and a siren 201. In addition to the air pressure sensors 131, 132, the invention further comprises at least one sensor 133, which can be a car door sensor, keyway sensor, or trunk lid sensor installed in the car 100 at the corresponding location.

When an abnormal condition at one particular location occurred, for example, when the car door is opened abnormally or an external body is inserted into the keyway (car door switch or ignition switch) after the burglar alarm mode of the car 100 has been armed up, the respective sensor sends an abnormality signal S to the on-vehicle main unit 20, causing the on-vehicle main unit 20 to output an audio alarm signal A through the siren 201, informing the owner of the car 100 of the occurrence of an abnormal condition. At the same time, the on-vehicle main unit 20 outputs a signal to a wireless communication apparatus 23, thereby causing the radio communication apparatus 23 to send by radio an alarm signal to a communication address assigned by the owner of the car 100. The communication address can be, for example, a mobile phone number, the telephone number of the car owner's house, the telephone number or fax number of the car owner's office, or an e-mail address. The aforesaid wireless communication apparatus 23 can be a GPRS mobile telephone, GSM, or PDA. The alarm signal can be a short message, pre-recorded chunk, fax message, or e-mail message.

Figure 3:
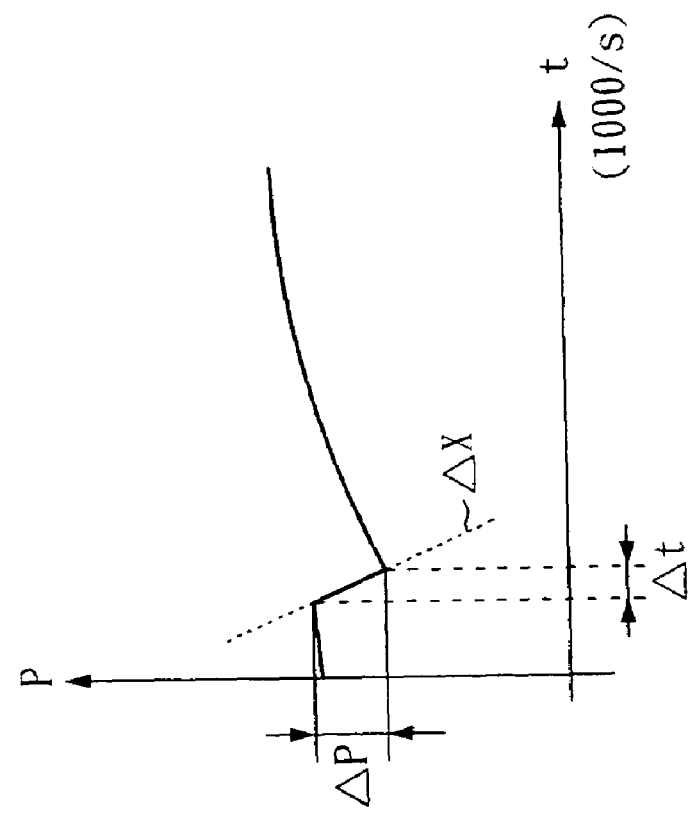
FIG. 3 is a schematic drawing showing an example of transient variation of air pressure according to the present invention.

The aforesaid air pressure sensor 131 is installed in the passenger room 102 in the inside chamber 101 of the car 100, and actively detects variation of air pressure in the passenger room 102. As shown in FIG. 3, when the air pressure sensor 131 detected the amount of transient variation of air pressure ΔX to be over the predetermined safety air pressure value set by the air pressure sensor 131, the air pressure sensor 131 immediately sends a corresponding air pressure abnormality signal SP. The aforesaid amount of transient variation of air pressure ΔX is the amount of variation of air pressure in the inside chamber 101 of the car 100 within a unit time. Upon receipt of the air pressure abnormality signal SP from the air pressure sensor 131, the on-vehicle main unit 20 controls the siren 201 to output an audio alarm signal, and simultaneously drives the wireless communication apparatus to send a message to the owner of the car 100. According to the present preferred embodiment, the air pressure sensor 131 is installed in the bottom side of the front seat in the passenger room 102. Alternatively, the air pressure sensor 131 can be installed in the steering wheel or instrument panel of the car 100, or a post or any suitable location in the inside chamber 101 of the car 100.

The aforesaid air pressure sensor 132 is installed in the trunk 104 in the inside chamber 101 of the car 100 and adapted to detect the amount of transient variation of air pressure ΔX in the trunk 104. When the amount of transient variation of air pressure ΔX surpassed the predetermined safety air pressure value, the air pressure sensor 132 immediately sends a corresponding air pressure abnormality signal SP. Upon receipt of the air pressure abnormality signal SP from the air pressure sensor 132, the on-vehicle main unit 20 controls the siren 201 to output an audio alarm signal, and simultaneously drives the wireless communication apparatus to send a message to the owner of the car 100. The aforesaid air pressure sensors 131, 132 are 15 psi sensors of which the detection range is 0~30 psi and the detection frequency is 1000 times per second.

Figure 4:
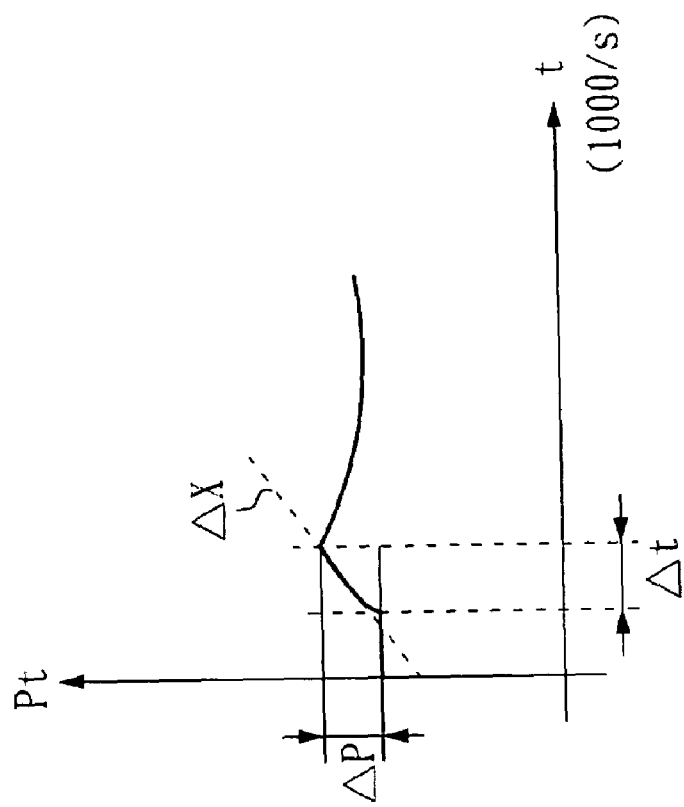
FIG. 4 is a schematic drawing showing another example of transient variation of air pressure according to the present invention.

The amount of transient variation of air pressure ΔX is produced upon a transient drop of air pressure upon opening of the car door or car trunk 104. Further, as shown in FIG. 4, when the inside chamber 101 of the car 100 is compressed or the airbag of the car 100 is triggered upon an impact of the car 100, a transient boost of air pressure is produced, at this time the air pressure sensors 131, 132 will send an air pressure abnormality signal SP to the on-vehicle main unit 20.

The air pressure induction type vehicle anti-thief device further comprises a stand-by battery 25 electrically connected to the on-vehicle main unit 20. When the power of the car battery of the car 100 is low, the stand-by battery 25 provides the on-vehicle main unit 20 with the necessary working voltage for normal functioning. The air pressure induction type vehicle anti-thief device further comprises a remote controller 27 through which the car owner can switch on/off the on-vehicle main unit 20 wirelessly at a remote place.

Although the present invention has been explained in relation to its preferred embodiment, it is to be understood that many other possible modifications and variations can be made without departing from the spirit and scope of the invention as hereinafter claimed.

What is claimed is:

1. An air pressure induction type vehicle anti-thief device installed in a motor vehicle, comprising:

an on-vehicle main unit;
at least one sensor mounted in at least one corresponding location of said motor vehicle and electrically connected to said on-vehicle main unit, each said sensor adapted to detect an abnormality of the respective corresponding location of said motor vehicle and to send a corresponding abnormality signal to said on-vehicle main unit; and
at least one alarm device electrically connected to said on-vehicle main unit and controlled to output a corresponding alarm upon said on-vehicle main unit in receipt of said corresponding abnormality signal from one said sensor on-vehicle main unit;
wherein, said at least one sensor includes an air pressure sensor installed in the inside chamber of said motor vehicle at a predetermined location and adapted to detect the amount of variation of air pressure in said inside chamber and to send an air pressure abnormality signal to said on-vehicle main unit, causing said on-vehicle main unit to control said at least one alarm device to output said alarm when the detected amount of transient variation of air pressure surpassed a predetermined safety air pressure variation value, said amount of transient variation of air pressure being the amount of variation of air pressure in the inside chamber of said motor vehicle within a unit time.

2. The air pressure induction type vehicle anti-thief device as claimed in claim 1, wherein said inside chamber of said motor vehicle is a passenger room, and said air pressure sensor is installed in said passenger room.

3. The air pressure induction type vehicle anti-thief device as claimed in claim 1, wherein said inside chamber of said motor vehicle is a trunk room, and said air pressure sensor is installed in said trunk room.

4. The air pressure induction type vehicle anti-thief device as claimed in claim 1, wherein said amount of transient variation of air pressure is the amount of transient air pressure drop in said inside chamber of said motor vehicle.

5. The air pressure induction type vehicle anti-thief device as claimed in claim 1, wherein said at least one alarm device includes a siren.

6. The air pressure induction type vehicle anti-thief device as claimed in claim 1, wherein said at least one alarm device includes a wireless communication apparatus connectable to a communication address assigned by the owner of said motor vehicle wirelessly.

7. The air pressure induction type vehicle anti-thief device as claimed in claim 6, wherein said wireless communication apparatus is a GPRS mobile telephone.

8. The air pressure induction type vehicle anti-thief device as claimed in claim 6, wherein said communication address is a mobile telephone number.

9. The air pressure induction type vehicle anti-thief device as claimed in claim 6, wherein said alarm is a short message.

10. The air pressure induction type vehicle anti-thief device as claimed in claim 1, further comprising a remote controller adapted to control on/off status of said on-vehicle main unit wirelessly.

* * * * *